United States Patent
Donovan et al.

[11] Patent Number: 5,918,773
[45] Date of Patent: Jul. 6, 1999

[54] COMBINED WATER PURIFIER/DISPENSER AND WALK-IN COOLER

[75] Inventors: Christine J. Donovan, 1000 Ruth Drive, Bryant, Ariz. 72022; George N. Smith, Orlando, Fla.; Larry D. Birge, Pequot Lakes, Minn.

[73] Assignee: Christine J. Donovan, Bryant, Ark.

[21] Appl. No.: 09/051,136

[22] PCT Filed: Oct. 2, 1996

[86] PCT No.: PCT/US96/16060

§ 371 Date: Apr. 1, 1998

§ 102(e) Date: Apr. 1, 1998

[87] PCT Pub. No.: WO97/13041

PCT Pub. Date: Apr. 10, 1997

Related U.S. Application Data

[60] Provisional application No. 60/008,070, Oct. 3, 1995.

[51] Int. Cl.$^6$ ................................................ F25D 23/12
[52] U.S. Cl. ............................................ 222/146.6; 62/338
[58] Field of Search ............................ 62/246, 265, 331, 62/338, 449; 222/146.6, 192

[56] References Cited

U.S. PATENT DOCUMENTS

| | | |
|---|---|---|
| Re. 19,973 | 5/1936 | Forman . |
| Re. 33,067 | 9/1989 | Corrigan . |
| 1,778,141 | 10/1930 | Birdsong et al. . |
| 1,889,499 | 11/1932 | Rorrer et al. . |
| 1,908,968 | 5/1933 | Forman . |
| 1,950,204 | 3/1934 | Wood et al. . |
| 1,959,926 | 5/1934 | Reich . |
| 1,995,729 | 3/1935 | Zarotschenzeff . |
| 2,011,731 | 5/1935 | Rorrer et al. . |
| 2,050,353 | 8/1936 | Matteson et al. . |
| 2,450,109 | 9/1948 | Brinkoeter . |
| 2,462,743 | 2/1949 | Handel . |
| 2,553,693 | 5/1951 | Wehr . |
| 2,625,806 | 1/1953 | Kennedy . |
| 4,160,727 | 7/1979 | Harris, Jr. . |
| 4,179,900 | 12/1979 | Corrigan . |
| 4,970,871 | 11/1990 | Rudick . |
| 5,108,590 | 4/1992 | DiSanto . |
| 5,112,477 | 5/1992 | Hamlin . |
| 5,140,832 | 8/1992 | Deininger et al. . |
| 5,297,400 | 3/1994 | Benton et al. . |
| 5,427,682 | 6/1995 | Vogel et al. . |
| 5,443,739 | 8/1995 | Vogel et al. . |

FOREIGN PATENT DOCUMENTS

WO97/13041    4/1997    WIPO .

OTHER PUBLICATIONS

Coster Engineering. "The Pure Water Machine. Pure Water. Almost Pure Profit". 3 pages. May 1, 1989.
Coster Engineering. "Coster Engineering Presents The Pure Water Machine". 7 pages. Jul. 2, 1992.
Coster Engineering. "Go With the Flow, Commercial Pure Water Systems form Coster Engineering". 11 pages. Jan. 1, 1990.

*Primary Examiner*—Andres Kashnihow
*Attorney, Agent, or Firm*—Steven P. Shurtz; Brinks Hofer Gilson & Lione

[57] ABSTRACT

A combined cooler and water purification and dispensing system comprises a walk-in cooler having an outside wall and a cooling system to cool the products within the cooler; a water purification and dispensing system adjacent the outside wall with the dispensing portion of the system being accessible from outside of the cooler; and a water supply system for supplying water to the water purification and dispensing system, the water supply system including a section inside the cooler, whereby water in the section of the water supply system inside the walk-in cooler is cooled so as to be dispensed in a chilled state from the water purification and dispensing system.

20 Claims, 5 Drawing Sheets

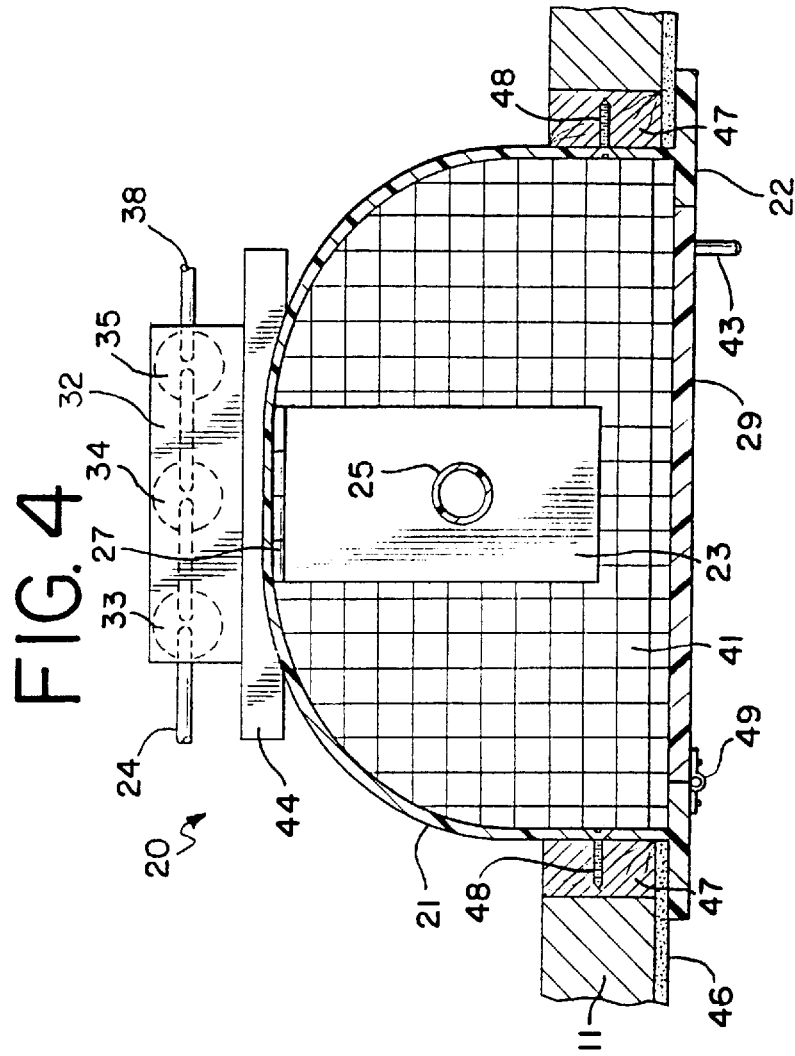
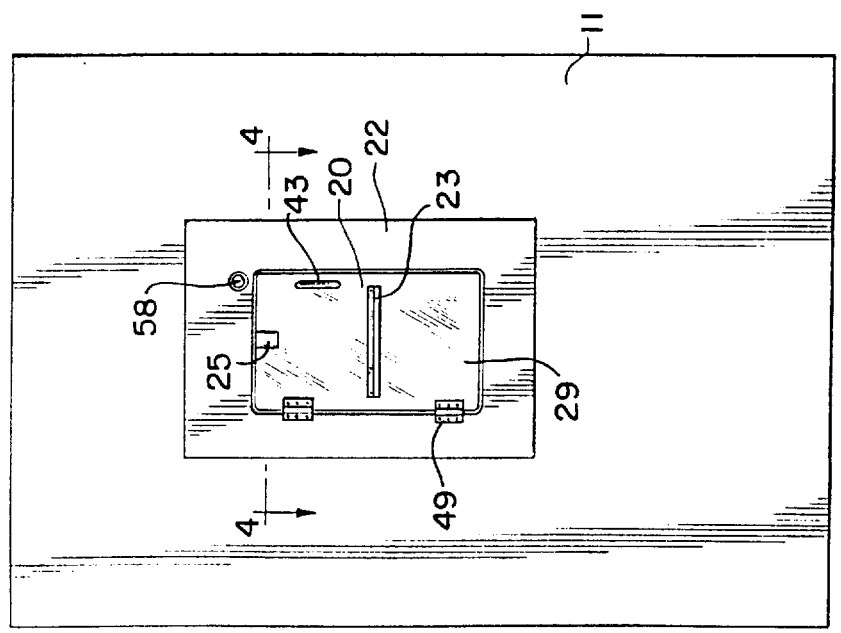

COMBINED WATER PURIFIER/DISPENSER AND WALK-IN COOLER

REFERENCE TO RELATED APPLICATION

This application claims the benefit of the filing date under 35 U.S.C. §119(e). U.S. Provisional Patent Application Ser. No. 60/008,070, filed Oct. 3, 1995, which is hereby incorporated by reference.

FIELD OF THE INVENTION

The present invention relates to a water purification and dispensing apparatus, and more particularly to the combination of a water purification and dispensing apparatus combined with a walk-in cooler.

BACKGROUND OF THE INVENTION

Water purification and dispensing apparatus are very well known. Many commercial retail outlets have on their premises a free standing water purification and dispensing unit. Typically, a customer will use either a container provided by the retail outlet or their own container and fill it at the machine. The machines are typically customer operated. Some machines are set up to vend the water and the customer pays by inserting money into the machine. Others are used where the customer pays for the water at the retail checkout counter.

There are many types of water purification and dispensing systems. U.S. Pat. No. 4,160,727 to Harris, Jr., discloses an apparatus utilizing staged reverse osmosis units for purifying and dispensing water. U.S. Pat. No. 5,108,590 to DiSanto discloses a self-service water dispensing apparatus especially adapted to be located inside a grocery store. Coster Engineering of Mankato, Minn. markets a number of water purification and dispensing machines for use in retail outlets.

Presently, many individuals carry a water bottle with them during their routine daily activities, as well as during physical activities such as bicycling and jogging. Sometimes these individuals purchase bottled water for this use. Such water bottles can be filled at the water purification and dispensing machines as they are presently known. However, the water from such machines is not typically cooled. Therefore, it is dispensed at either room temperature or the temperature that the water is supplied to the machine. U.S. Pat. No. 5,112,477 to Hamlin discloses an apparatus which dispenses purified water and ice made from purified water. In addition to the water purification system, a cooling system must also be included in the machine to form the ice. Hence, the machine is fairly complicated. It would be beneficial to have a water purification and dispensing machine that could dispense cold water without having the machine include an extra cooling system.

In the home there are, of course, refrigerators that dispense cooled water. U.S. Pat. No. 2,553,693 to Wehr discloses a refrigerator with tubing mounted on the inside and a faucet located on the outside through which water cooled within the refrigerator can be dispensed. Presently available home refrigerators include a water reservoir in the refrigerated compartment that is connected to a water delivery device on the door of the refrigerator. Such systems generally do not provide any water purification within the system, nor would they be equipped to handle the flow rates and large volumes as are normally dispensed through water purification and dispensing machines located in retail outlets.

There is therefore a need for a water purification and dispensing apparatus which is both simple and yet can dispense large volumes and flow rates of cooled, purified water.

SUMMARY OF THE INVENTION

A chilled water purification and dispensing apparatus has been invented which meets this need. The system combines a water purification and dispensing machine with a walk-in cooler that is present in the retail location.

In one aspect, the invention is a combined walk-in cooler and water purification and dispensing system comprising:

a) a walk-in cooler having an outside wall and a cooling system to cool products within the cooler;

b) a water purification and dispensing system adjacent the outside wall of the cooler with the dispensing portion of the system being accessible from outside of the cooler; and c) a water supply system for supplying water to the water purification and dispensing system, the water supply system including a section inside the cooler, whereby water in the section of the water supply system inside the cooler is cooled so as to be dispensed in a chilled state from the water purification and dispensing system.

Preferably the water purification and dispensing equipment is mounted in an otherwise unused, insulated wall of the cooler so that its face is flush with the wall. Alternatively, the water purification and dispensing system is mounted directly behind a door of the cooler, or in a panel that replaces one of the doors of the cooler. The remainder of the equipment is located inside of the cooled space. Preferably the water line supplying the water purification and dispensing system has good heat transfer properties and a sufficient length such that water flowing to the dispensing system is being cooled by the existing cooling equipment within the cooler.

The invention will best be understood in view of the drawings, a brief description of which is as follows.

BRIEF DESCRIPTION OF THE DRAWINGS

FIG. 1 is a front elevational view of a water purification and dispensing system mounted in the wall of a walk-in cooler.

FIG. 4 is a cross sectional view taken along line 4—4 of FIG. 1.

DETAILED DESCRIPTION OF THE DRAWINGS AND PREFERRED EMBODIMENTS OF THE INVENTION

Figure 5:
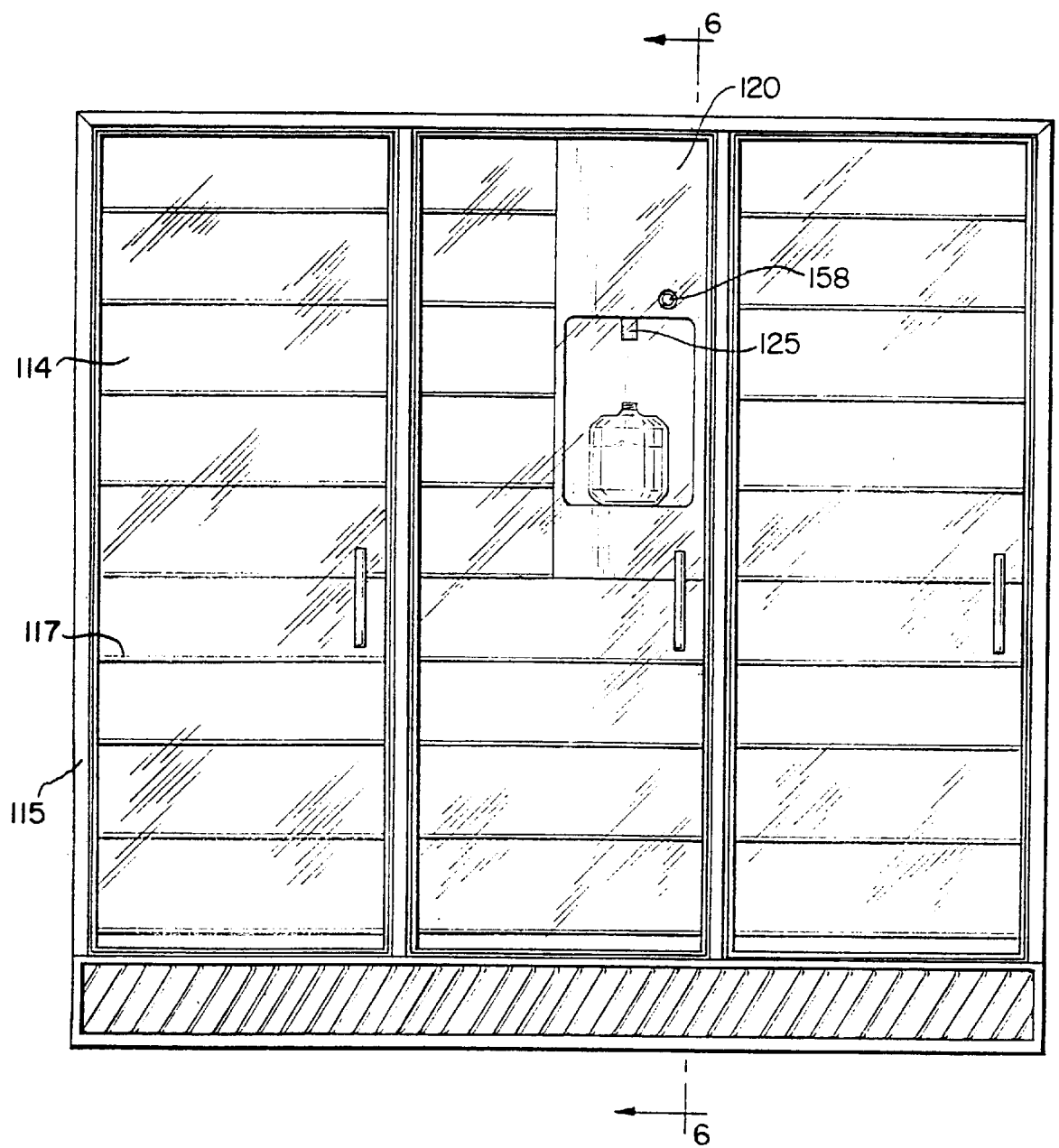
FIG. 5 is a front elevational view of a second embodiment of the invention showing a water purification and dispensing system located behind a door of a walk-in cooler.
Figure 6:
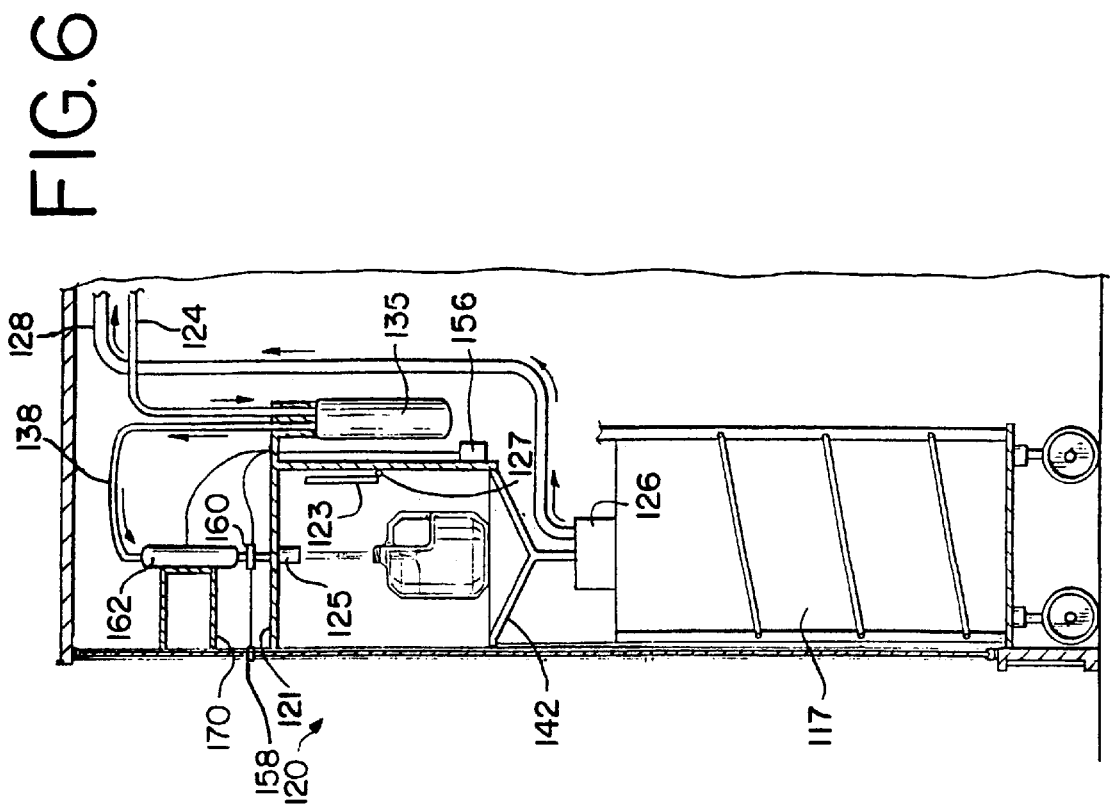
FIG. 6 is cross-sectional view taken along line 6—6 of FIG. 5.

There are three basic preferred embodiments of the present invention. Each embodiment includes a walk-in cooler having an outside wall (which may be an insulated wall or comprised of glass doors through which products may be viewed and removed), a water purification and dispensing system adjacent the outside wall and a water supply system. In the first embodiment, shown in FIGS. 1–4, the water purification and dispensing system is mounted in the wall of the walk-in cooler. In the second embodiment, used when a store does not have an exposed cooler wall, the water purification and dispensing system is mounted behind one of the doors of the walk-in cooler (FIGS. 5–6). In the third embodiment, the water purification and dispensing system is mounted in a panel which is used to replace one of the doors of the cooler.

Figure 2:
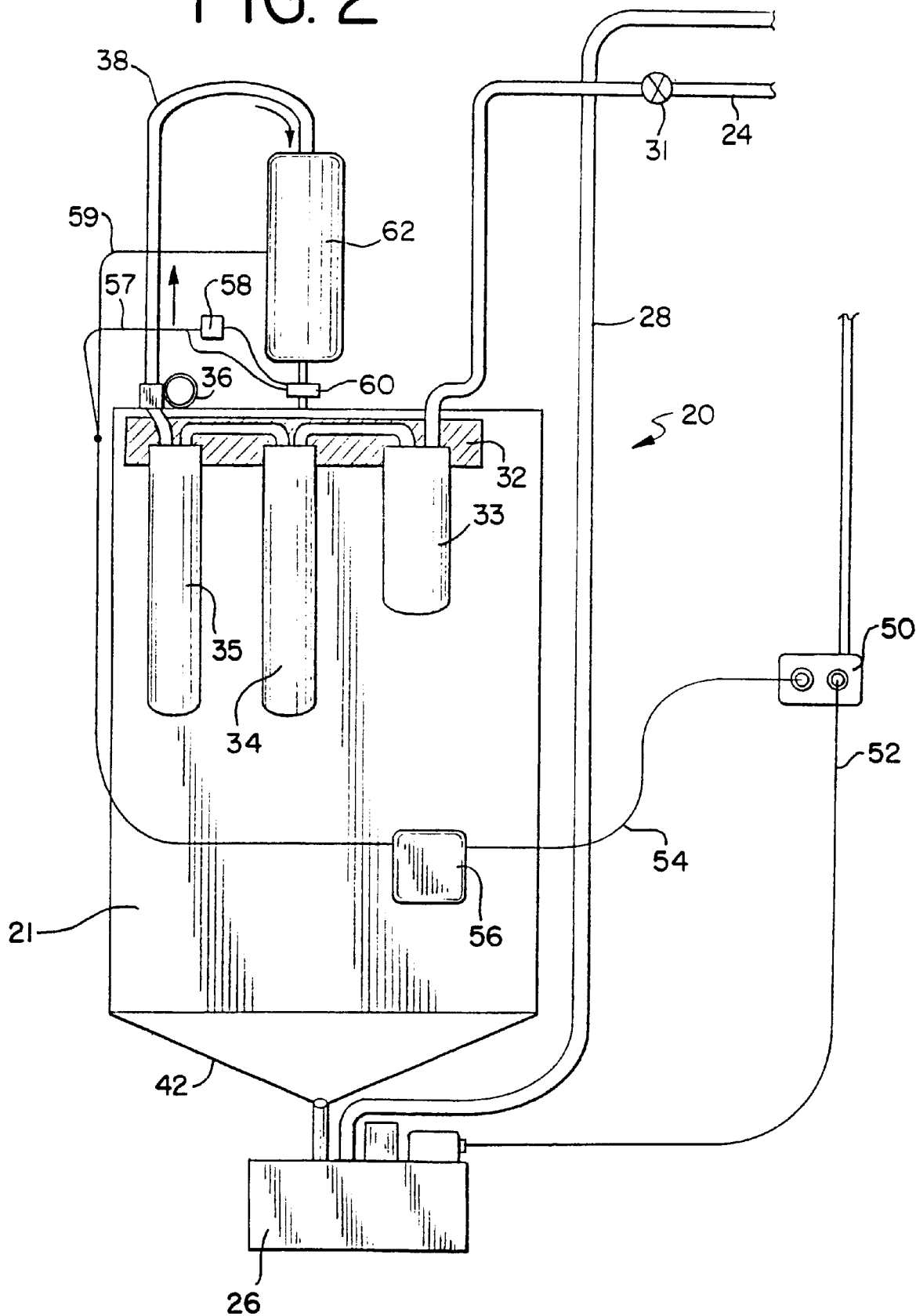
FIG. 2 is a schematic, rear elevational view of the water purification and dispensing system of FIG. 1
Figure 3:
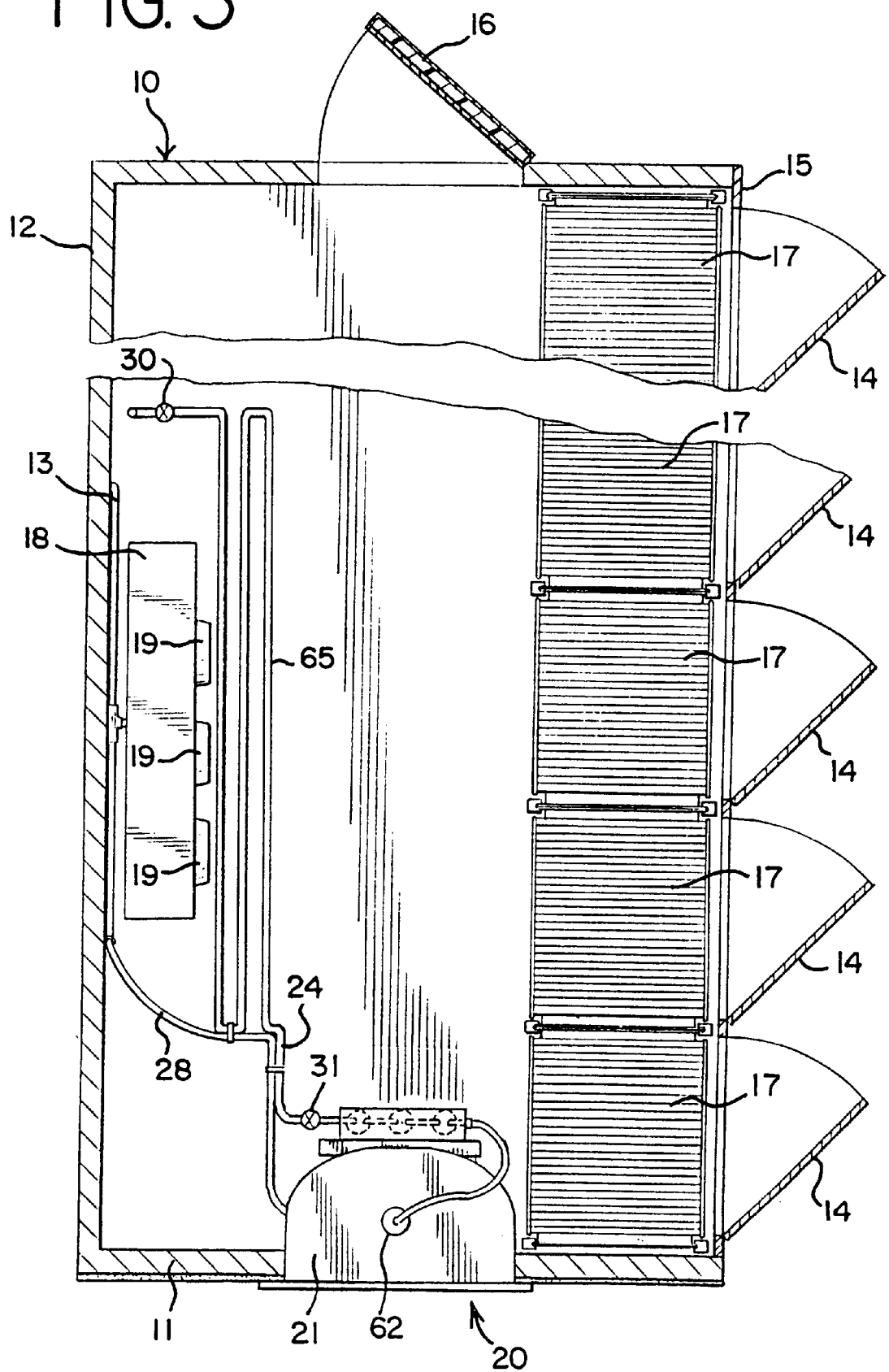
FIG. 3 is a top plan view of the walk-in cooler and water purification and dispensing system shown in FIG. 1.

Typical walk-in coolers are used for chilling beverages or perishables for self-service purchase by customers. Such walk-in coolers are commonplace in retail stores, especially convenience stores. The coolers typically maintain a temperature of about 320 to about 34° F. As shown in FIG. 3, the typical walk-in cooler 10 is made of insulated walls 12 on three of its outside walls, with the fourth outside wall comprised of one or more doors 14 that are typically glass and mounted in a door frame 15. Another door 16 is used for store employees to walk in and out of the cooler 10. Products in the cooler 10 are often displayed on wheeled racks 17 placed behind the glass doors 14. Thus chilled products can be viewed and removed through the glass doors 14.

The walk-in cooler 10 includes a cooling system 18 to cool products within the cooler 10. Typically the cooling system 18 comprises a chiller mounted on the ceiling and connected to a refrigeration system (not shown). The chiller typically includes one or more fans 19 that blow or draw air past an evaporator in the chiller. The air is thus cooled by the evaporator and circulated in the space within the cooler 10. The chiller typically includes a condensate drain line 13 through which moisture in the air that condenses on the evaporator is removed from the cooler 10.

In the embodiment shown in FIG. 3, the cooler 10 includes one insulated wall 11 that is otherwise unused and has an exposed outside surface making up an inside wall within the store. As shown in FIG. 1, this wall has a porthole cut therethrough and a water purification and dispensing system 20 mounted in the wall 11. The water purification and dispensing system 20 can be of any design. The purification can be provided by filtration or by reverse osmosis as is needed for the local water supply. The patents listed previously disclose details for such purification systems, and are hereby incorporated by reference.

As best shown in FIG. 4, the water purification and dispensing system 20 preferably comprises a fiberglass housing 21 which is provided with a lip 22 which acts as a flange to cover the front of the opening provided in the wall 11 of the cooler. The lip 22 fits flush against the drywall 46 or other sheathing making up the outside surface of wall 11. The lip 22 thus acts as a stabilizing point for the equipment, as well as improving the aesthetic appearance by providing a finished look for the water purification and dispensing equipment. The wall 11 is preferably framed around the porthole with treated lumber 47. Screws 48 may be used to hold the housing 21 into the framing lumber 47. This arrangement has been found suitable to support the water purification and dispensing system 20 within the wall 11, and no further support is needed. If the wall 11 is not sufficient to support the system 20, a stand or table inside the cooler 10 may be used.

The cooler wall 11 generally includes insulation. Caulking is preferably used at the joints around the wall 11 and the system 20, both on the front and back side of the wall 11. Alternatively, a double rubber casing (not shown) may be used around the dispensing equipment 20 and the wall 11 to seal off the cooler. In that case, the lip 22 would cover this double rubber casing. An individual looking at the system of this embodiment of the present invention only sees the purification and dispensing system 20, plus any merchandising and/or signage that is included on the cooler wall 11 or surrounding the system.

As best shown in FIG. 3, the main portion of the purification/dispensing equipment 20 is inside the cooler 10. A water supply line 24 provides fresh water to the water purification and dispensing equipment 20. A drain pump 26 is used to provide pressure to expel overflow water from the dispensing system to any point necessary to drain the water somewhere out of the cooler 10. The routing of the drain line 28 is to be designed on a location-by-location basis. Preferably, as shown in FIG. 3, the drain line 28 connects to the condensate drain line 13 from the chiller 18.

Chilled water can be supplied to the water purification and dispensing system 20 through either a reservoir located within the cooler or, more preferably, through tubing mounted within the cooler. If used, the reservoir would need a large surface area or be provided with fins or other mechanism to provide sufficient heat exchange between the water in the reservoir and the cooled air within the cooler. One reason that a reservoir is not preferred is because the reservoir would tend to collect bacteria and other contamination due to oxidation. This would require the water purification system to work harder. If a filter was used, the filter would be depleted more quickly. The tank would also require additional maintenance and have to be sanitized on a routine basis. This would produce down time and extra maintenance costs. In addition, if the tank included a level or float to control the amount of water in the tank, or a fill indicator which allowed further water to enter the tank once a certain portion of it had been used, this would involve moving parts which could break down and cause faulty situations.

As shown in FIG. 3, preferably the section of the water supply line 24 inside the cooler 10 includes a portion 65 positioned such that air blown by fans 19 impinges on the portion 65. This portion 65 may preferably be tubing formed in a back and forth design so that a sufficient length of tubing can fit within the cooler. The water supply line 24 connects to existing water lines within the establishment where the cooler is located to provide water, such as from a city approved water source.

Preferably, the section of supply line 24 inside the cooler is copper tubing having a ¾ inch diameter. It is estimated that the copper tubing will generally need to be over 60 feet, preferably over 100 feet, and if large volumes of usage are expected, over 150 feet in length. The preferred length will be determined by the dimensions of the cooler and the expected usage of the water purification and dispensing system 20.

Upon entering the cooler 10, the supply line 24 will have a shut off valve 30 for use in emergencies. The supply line 24 is preferably mounted to the ceiling of the cooler. This will keep the supply line from being in the way of other uses being made of the cooler. Preferably, the final 50 to 75 feet of the copper tubing is placed directly in the path of cooling fans 19 in the cooler so that air circulated by the fans is directed on the tubing. The chilled air impinging on the tubing causes an efficient heat transfer for chilling the tubing and the water within.

It is preferred that the dispensing unit allows for a five gallon container to be filled, and that the flow rate be at least 1.5 gallons per minute. However, if the dispensing unit is routinely used for larger jugs, a flow rate of 2 gallons per minute may be preferred. If a customer were to fill a five gallon jug, the water within the chilled tubing of the cooler would be depleted. By having cool air directly hit the last length of tubing, the system will be assured of providing chilled water even if the initial water is depleted. Preferably, the tubing also includes a shut off valve 31 (FIG. 2) at the point where it connects to the water purification and dispensing system 20. Also, it is preferred that a portion of the supply line 24 directly connected to the system 20 be flexible to allow for easy connection of the equipment to the water supply line 24. Preferably, the supply line 24 will also have metal reinforcements which will add to its heat transfer capabilities.

The preferred water purification and dispensing system is capable of filling 12 oz. bottles, paper cups, one gallon jugs, five gallon jugs or other sizes of containers with chilled water upon demand. A preferred water purification and dispensing system is shown in FIGS. 1 and 4 and schematically in FIG. 2.

The dispensing system includes a shelf 23 on which a small jug, bottle or cup can be placed for filling. The shelf 23 is preferably connected to the housing 21 by a hinge 27, allowing the shelf to be flipped between a first position, in which it is horizontal and supports a jug, to a second position (as seen with the second embodiment in FIG. 6) where the shelf is out of the way of the dispensing spout 25. When the shelf 23 is folded up, a larger jug can be placed inside the housing 21, resting on the grate 41 at the bottom of the housing.

A plexiglass door 29, with a handle 43 and mounted by hinges 49, keeps the housing closed when the system is not in use and prevents water from splashing out onto the floor if a customer improperly places a jug under the fill spout 25. With the door 29 closed and a jug, bottle, cup or other container under the spout 25, the customer depresses fill button 58 to dispense chilled, purified water into the container, releasing button 58 when the container is filled to the desired level.

The back of the housing 21 includes a mounting bracket 44 to which is attached a manifold 32. Three filters 33, 34 and 35 are attached to the manifold 32. Water enters the manifold from supply line 24 and passes in series through the filters 33–35. The purified water passes out of the manifold and through a flow meter 36, through line 38 to an ultraviolet light fixture 62 which is of a standard design and is not shown in detail. It is noted, however, that the water passes through a clear tube surrounding the U.V. light bulb inside the fixture before exiting out the bottom of fixture 62. The water than passes through a solenoid operated valve 60 before exiting through delivery spout 25 in the inside of housing 21 (FIG. 1). Any water that overflows a container placed in the housing 21 passes through the grate 41 and into the funnel shaped bottom portion 42 of the housing, from which it flows to the drain pump 26.

Electrical power for the system is supplied from an ordinary wall outlet 50. One wire 52 supplies power to the pump 26. Another wire 54 supplies power to power pack 56. Power pack 56 has two sets of wires coming out. One set of wires 59 provides the electrical circuit to the U.V. light fixture 62. The other set of wires 57 provides power to a circuit which includes the fill button 58 and the solenoid valve 60.

Preferably the power pack 56 will include circuitry so that the fill button 58 cannot open solenoid valve 60 unless the U.V. light is functioning properly. Also, a counter (not shown) may be added to the electrical system to count the number of times the fill button 58 is operated.

The preferred design uses only the cold air within the cooler 10 to chill the water. As the water flows through the chilled tubing 24, the transfer of the heat of the water into the cooler takes place. As the water travels through the pipes being contacted by the forced air from the cooler fans 19, the heat transfer intensifies. Preferably the system can provide water at a flow rate of 2 gallons per minute cooled to 40° F. or below on an indefinite basis. However, at no time is there a chance of freezing as the temperatures are maintained in the cooler so as to not go below 32° F. The length of the section 65 in front of the chiller 18 can be modified as needed by increasing or decreasing the number of switchbacks in the tubing. Alternatively, the section 65 could be in the form of a spiral coil, the exact shape of which will be determined by the availability of space within the cooler.

A second embodiment of the invention is shown in FIGS. 5 and 6. The water purification and dispensing system 120 used in this embodiment can be the same as the water purification and dispensing system 20 used in the first embodiment. However, with this embodiment it may be preferred to use a smaller system so as to take up less space. The walk-in cooler and water supply systems are generally the same as those in the first embodiment. Therefore, reference numbers used in FIGS. 5 and 6 are the same as those used for the same components in FIGS. 1–4, except that they have been increased by an addend of 100. Thus the cooler has doors 114 mounted in a frame 115, etc.

The primary difference between the second embodiment of the invention, compared to the first embodiment, is that the cooler wall which the water purification and dispensing system 120 is adjacent is the wall in which the glass doors 114 are placed. In fact, the water purification and dispensing system 120 is mounted or otherwise located within the cooler behind a door 114, and is accessible when the door 114 is opened. In the embodiment shown in FIG. 5, no separate door (such as door 29 in the first embodiment) closing housing 121 is shown, but such a door would be preferred to keep water from splashing on the customer when the cooler door 114 is opened, and from splashing inside the cooler, when the system is operated.

FIG. 6 shows several details of the system not seen in FIGS. 1–4. Preferably a bracket 170 connected to the wall is used to hold the U.V. light fixture 162 above the housing 121. Also, the folded position of shelf 123 can be clearly seen. In this embodiment the pump 126, and indeed the entire dispensing system, may be supported on a specially designed rack 117. The use of a rack 117 with product storage and display shelves to the side and beneath the water purification and dispensing system allows the store owner to maximize usage of the display area of the cooler, as compared to the third embodiment.

Figure 7:
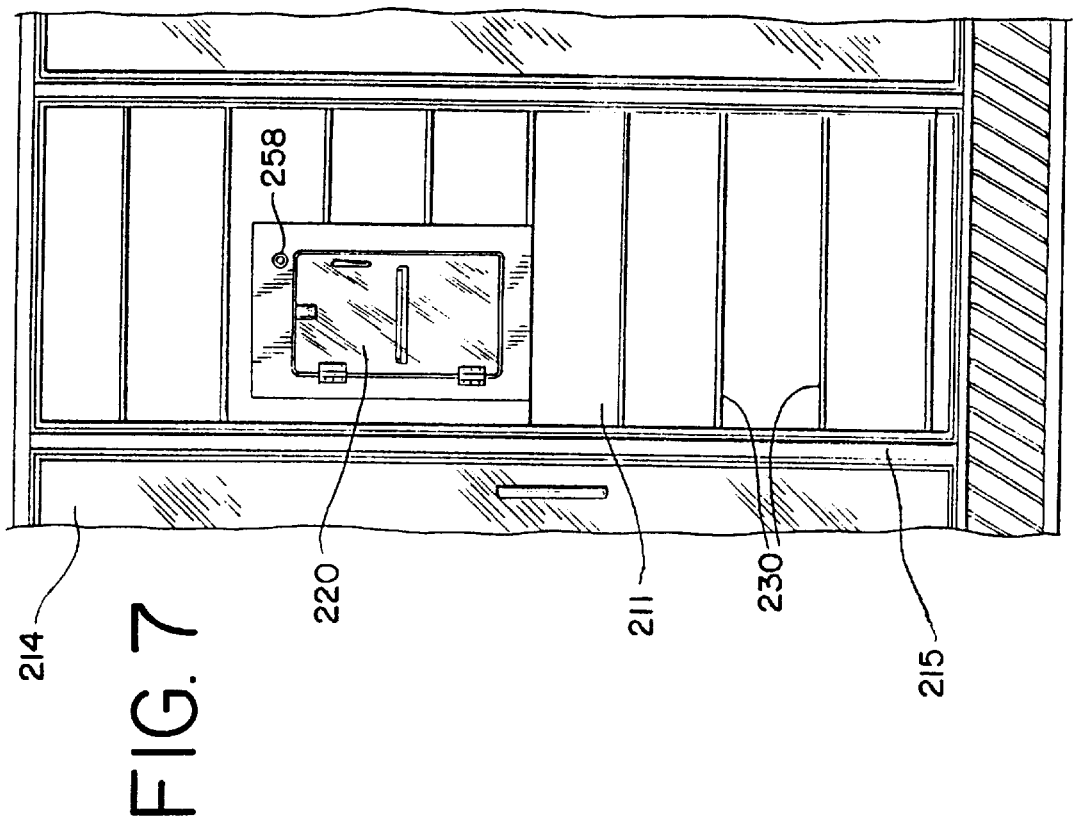
FIG. 7 is a front elevational view of a third embodiment of the invention showing a water purification and dispensing system mounted in a panel held in the door frame of a walk-in cooler.

In the embodiment of FIG. 7, used when the cooler does not have an exposed, unused wall, a panel 211 is used to replace one of the doors of the cooler. The panel 211 fits into the door frame 215 and is flush with the front of the other doors 214 on the cooler. The water purification and dispensing system 220 may be just the same as the system 20 used in the first embodiment. The system 220 is mounted in the panel 211 just as the first embodiment of the invention uses a mounting in the side wall 11 of the cooler. In the embodiment of FIG. 7, shelving 230 can be provided around the dispenser as determined by the space available. In this embodiment, the display unit will recess into the cooler by the dimensions of the door frame and be as deep as the dispenser dictates.

With this embodiment, a table or stand (not shown) may be needed to support the purification and dispensing system 220. The table or stand would preferably be made of stainless steel.

The preferred embodiments of the present invention involves no moving parts and no machines to make the system work other than the flow meter 36 fill button 58, solenoid 60 and pump 26. The only commodity that is required to provide cooled, chilled purified water is the cool air already found within the cooler on the premises. Chilled water can thus be provided at virtually no expense to the retail operator other than the initial installation cost.

There may be some instances in which a reverse osmosis treatment to the water will be necessary to adequately clean the source water. Many hazardous chemicals can be accumulated through the distribution of older water systems, as well as improper usage of materials in buildings. The water in each location should therefore be tested so that the system put into a location will obtain the required standards.

A reverse osmosis system takes out lead and other chemicals which are not seen in all areas. However, in order to have enough water going to the delivery system, a holding tank is necessary. As previously stated, a holding tank is not preferred for many reasons. Therefore, a reverse osmosis system would be added when no other options exist. The reverse osmosis system and holding tank will preferably be placed outside the cooler. The copper tubing that goes into the cooler would feed off of this tank. The tank may have to be 50 to 100 gallons in size, depending on the rate at which the reverse osmosis system operates and expected usage during peak conditions. It takes a reverse osmosis system anywhere from one to five hours to produce one gallon of water, depending on the quality of the water and the condition of the reverse osmosis membrane. In order to ensure that water is available at all times for delivery into the dispenser (which will always contain a filtration system as a last point of cleansing prior to dispensing), a large reservoir is necessary. It would, however, not be necessary to house this tank inside the cooler. In fact, reverse osmosis systems work better at room temperature. The length of the copper tubing and placement thereof would be adequate to chill the water as previously stated. It may, however, increase utility costs if one were to chill 50 to 100 gallons in a holding tank.

In the preferred embodiment of the invention, the housing 21 is rounded as shown in FIG. 4 to give an aesthetic appearance and is made of fiberglass, preferably between 3/16 and 1/4 inch thick. The housing may also be made of stainless steel. The preferred housing is about 20 inches wide, 32 inches high and 15½ inches deep. The shelf 23 is preferably rubber coated. The grate 41 is preferably spaced at least 1½ inches above the bottom 42 of the housing. This distance prevents water from splashing back up from the bottom of the dispenser once it passes through the grate 41. Preferably the drain line is sized to handle the flow of water at the maximum capacity of the dispenser. A drain fitting of 3/4 inch and a 3/4 inch drain line will be sufficient so that 2 gallons per minute of water will not overflow the bottom, funnel portion 42 of the housing.

Filter 33 is preferably a 5 micron sediment filter, and filters 34 and 35 are preferably ½ micron filters so as to be able to remove cryptodporidium cysts and other impurities. Preferably the filter housings are made of plastic material. Suitable filters are available from Cuno.

The ultraviolet light fixture 62 should be mounted as close as possible to the dispensing spout 25, even if the filters are mounted somewhere other than on the back of the housing 21. A preferred U.V. fixture 62 is Model UVT-8-A manufactured by Hydro-Flow and available through Yes Distributing Inc., Egan, Minn. This model has ¼ inch John Guest fittings on the water connections for easy replacement of the fixture if the U.V. light quits working.

Of course further changes could be made to the system such that flavored and/or carbonated beverages could be dispensed using the purified and cooled water available from the invention.

It should be appreciated that the apparatus and methods of the present invention are capable of being incorporated in the form of a variety of embodiments, only a few of which have been illustrated and described above. The invention may be embodied in other forms without departing from its spirit or essential characteristics. For example, the supply line may be mounted on a wall inside of the cooler, rather than the ceiling. The equipment could be further simplified by replacing the push button 58 and solenoid valve 60 with a hand operated valve. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A combined walk-in cooler and water purification and dispensing system comprising:
    a) a walk-in cooler having an outside wall and a cooling system to cool products within the cooler;
    b) a water purification and dispensing system adjacent the outside wall of the cooler with the dispensing portion of the system being accessible from outside of the cooler; and
    c) a water supply system for supplying water to the water purification and dispensing system, the water supply system including a section inside the cooler, whereby water in the section of the water supply system inside the cooler is cooled so as to be dispensed in a chilled state from the water purification and dispensing system.

2. The combined walk-in cooler and water purification and dispensing system of claim 1 wherein the water purification and dispensing system comprises a filter to purify the water.

3. The combined walk-in cooler and water purification and dispensing system of claim 1 wherein the water purification and dispensing system comprises a reverse osmosis unit to purify the water.

4. The combined walk-in cooler and water purification and dispensing system of claim 1 wherein the dispenser is mounted in the outside wall of the cooler.

5. The combined walk-in cooler and water purification and dispensing system of claim 4 wherein the outside wall of the cooler wherein the water purification and dispensing system is mounted comprises an insulated wall of the cooler.

6. The combined walk-in cooler and water purification and dispensing system of claim 4 wherein the outside wall of the cooler wherein the water purification and dispensing system is mounted comprises a panel fit within a door frame of the cooler.

7. The combined walk-in cooler and water purification and dispensing system of claim 1 wherein the outside wall to which the water purification and dispensing system is adjacent comprises a door, and the water purification and dispensing system is located within the cooler behind the door and is accessible when the door is opened.

8. The combined walk-in cooler and water purification and dispensing system of claim 1 wherein the section of the water supply system within the walk-in cooler comprises tubing of over 60 ft. in length.

9. The combined walk-in cooler and water purification and dispensing system of claim 1 wherein the section of the water supply system within the walk-in cooler comprises tubing of over 100 ft. in length.

10. The combined walk-in cooler and water purification and dispensing system of claim 1 wherein the cooling system comprises one or more fans that circulate cold air in the cooler and at least a portion of the section of the water supply system within the cooler is positioned so that air circulated by the one or more fans impinges on said portion of the water supply system.

11. The combined walk-in cooler and water purification and dispensing system of claim 1 wherein the water purification and dispensing system can dispense water at a rate of at least 1.5 gallons per minute.

12. The combined walk-in cooler and water purification and dispensing system of claim 1 wherein the water purification and dispensing system can dispense water at a rate of at least 2 gallons per minute.

13. The combined walk-in cooler and water purification and dispensing system of claim 1 wherein the water purification and dispensing system can dispense water at a rate of 1.5 gallons per minute at 40° F. or less on a continuous, indefinite basis.

14. The combined walk-in cooler and water purification and dispensing system of claim 1 wherein the water to be dispensed is cooled only by cold air within the walk-in cooler.

15. The combined walk-in cooler and water purification and dispensing system of claim 1 wherein the walk-in cooler further comprises doors through which chilled products may be viewed and removed.

16. The combined walk-in cooler and water purification and dispensing system of claim 1 wherein the cooling system comprises a chiller having a condensate drain line and a drain line from the water purification and dispensing system connects with the chiller condensate drain line.

17. The combined walk-in cooler and water purification and dispensing system of claim 1 further comprising a pump to expel overflow from the dispensing system from the walk-in cooler.

18. The combined walk-in cooler and water purification and dispensing system of claim 1 wherein the water purification and dispensing system further comprises a shelf pivotable between a first and second position on which a water jug may be placed under a fill spout when the shelf is in said first position and which is moved out from under the fill spout when in said second position.

19. A combined walk-in cooler and water purification and dispensing system comprising:
   a) a walk-in cooler having an outside wall, the cooler including a cooling system comprising one or more fans which circulate cold air in the cooler;
   b) a water purification and dispensing system mounted in the outside wall of the cooler with the dispensing portion of the system being accessible from outside of the cooler; and
   c) a water supply system for supplying water to the water purification and dispensing system, the water supply system including a section at least 60 ft. in length inside the cooler, at least a portion of which is positioned so that air circulated by the one or more fans impinges on said portion, whereby water in the section of the water supply system inside the cooler is cooled so as to be dispensed in a chilled state from the water purification and dispensing system.

20. A combined walk-in cooler and water purification and dispensing system comprising:
   a) a walk-in cooler having an outside wall comprising one or more doors through which products within the cooler can be removed, the cooler also including a cooling system to cool the products within the cooler;
   b) a water purification and dispensing system mounted behind one of said doors, with the dispensing portion of the system being accessible from outside of the cooler when said door is opened; and
   c) a water supply system for supplying water to the water purification and dispensing system, the water supply system including a section inside the cooler whereby water in the section of the water supply system inside the cooler is cooled so as to be dispensed in a chilled state from the water purification and dispensing system.

* * * * *

UNITED STATES PATENT AND TRADEMARK OFFICE
CERTIFICATE OF CORRECTION

PATENT NO.    : 5,918,773
DATED         : July 6, 1999
INVENTOR(S)   : Christine J. Donovan et al.

It is certified that error appears in the above-identified patent and that said Letters Patent is hereby corrected as shown below:

On the Title Page

In column 1, item [75], delete "Bryant, Ariz." and substitute --Bryant, Ark.-- in its place.

Signed and Sealed this

Fifteenth Day of May, 2001

Attest:

NICHOLAS P. GODICI

Attesting Officer      Acting Director of the United States Patent and Trademark Office